US008772616B1

(12) United States Patent
Jennings

(10) Patent No.: US 8,772,616 B1
(45) Date of Patent: Jul. 8, 2014

(54) EDUCATION GUITAR AND METHOD OF MANUFACTURE

(71) Applicant: Kurt Jennings, Soquel, CA (US)

(72) Inventor: Kurt Jennings, Soquel, CA (US)

(*) Notice: Subject to any disclaimer, the term of this patent is extended or adjusted under 35 U.S.C. 154(b) by 0 days.

(21) Appl. No.: 13/764,321

(22) Filed: Feb. 11, 2013

Related U.S. Application Data

(63) Continuation-in-part of application No. 13/033,626, filed on Feb. 24, 2011, now abandoned.

(51) Int. Cl.
*G10D 3/06* (2006.01)

(52) U.S. Cl.
USPC .......................... 84/314 R; 84/293; 84/385 R

(58) Field of Classification Search
USPC ............................. 84/485, 293, 314 R, 477 R
See application file for complete search history.

(56) References Cited

U.S. PATENT DOCUMENTS

| | | | | | |
|---|---|---|---|---|---|
| 346,424 | A | * | 7/1886 | Burton | 84/314 R |
| 357,168 | A | * | 2/1887 | Barnwell | 84/314 R |
| 494,698 | A | * | 4/1893 | Zorger | 84/314 R |
| 1,991,864 | A | * | 2/1935 | Hjalmar et al. | 84/477 R |
| 3,403,590 | A | * | 10/1968 | Quinton | 84/470 R |
| 3,748,947 | A | * | 7/1973 | Freiheit | 84/485 R |
| 3,845,686 | A | * | 11/1974 | Salvo | 84/485 R |
| 3,978,756 | A | * | 9/1976 | Feldman | 84/470 R |
| 4,286,495 | A | * | 9/1981 | Roof | 84/485 R |
| 4,291,606 | A | * | 9/1981 | Lepage | 84/291 |
| 4,417,497 | A | * | 11/1983 | Nicklaus | 84/485 R |
| 4,807,509 | A | * | 2/1989 | Graham | 84/314 R |
| 5,429,029 | A | * | 7/1995 | Mendiola, Jr. | 84/471 R |
| 5,458,040 | A | * | 10/1995 | Lawrence, Jr. | 84/473 |
| 5,920,023 | A | * | 7/1999 | Ravagni et al. | 84/485 R |
| 5,977,462 | A | * | 11/1999 | Wolfson | 84/267 |
| 6,218,603 | B1 | * | 4/2001 | Coonce | 84/485 R |
| 6,452,080 | B1 | * | 9/2002 | Coonce | 84/477 R |
| 6,452,081 | B1 | * | 9/2002 | Ravagni et al. | 84/477 R |
| 6,781,049 | B2 | * | 8/2004 | Taylor | 84/477 R |
| 6,984,780 | B2 | * | 1/2006 | Reierson | 84/314 R |
| 7,381,878 | B2 | * | 6/2008 | Cook | 84/464 A |
| 7,408,105 | B2 | * | 8/2008 | Murdock | 84/477 R |
| 7,427,704 | B2 | * | 9/2008 | Huwaldt | 84/314 R |
| 7,427,707 | B2 | * | 9/2008 | Shaffer | 84/464 A |
| 7,465,870 | B1 | * | 12/2008 | Homan | 84/743 |
| 7,732,687 | B2 | * | 6/2010 | Shaffer | 84/314 R |
| 7,825,313 | B2 | * | 11/2010 | Shaffer | 84/293 |
| 8,138,404 | B1 | * | 3/2012 | Petros | 84/291 |
| 2010/0122621 | A1 | * | 5/2010 | Newstetter | 84/314 R |
| 2012/0111174 | A1 | * | 5/2012 | Portalet | 84/293 |
| 2012/0285314 | A1 | * | 11/2012 | Kellner | 84/485 R |

* cited by examiner

*Primary Examiner* — Robert W Horn
(74) *Attorney, Agent, or Firm* — Allen D. Hertz, P.A.; Allen D. Hertz

(57) ABSTRACT

A stringed instrument having a series of note references laser etched into a fingerboard. Each note reference is located respective to a position along a length of a respective string to generated the respective note. The note references are laser etched into the fingerboard using a laser wood removal system. The laser system is programmed to generate a series of recessions within the fingerboard in accordance with a programmed directive. The programming defines the location of each note reference adjacent to a respective fret and under the respective string. The programming accounts for the neck dimensions, fret locations (based upon the scale), string spacing, etc. The laser system can accommodate a neck (removed from the stringed instrument) or the entire instrument. The recessions can be left as formed or filled with a note reference filler to increase a contrast between the note reference and the fingerboard.

20 Claims, 8 Drawing Sheets

US 8,772,616 B1

EDUCATION GUITAR AND METHOD OF MANUFACTURE

CROSS-REFERENCE TO RELATED APPLICATION

This application is a Continuation-In-Part patent Application claming the benefit of co-pending United States Non-Provisional patent application Ser. No. 13/033,626, filed on Feb. 24, 2011, which is incorporated herein in its entirety.

FIELD OF THE INVENTION

The present invention relates to a stringed instrument training device and method of fabrication, and more particularly, a method of fabricating or modifying a stringed instrument to include a series of laser generated notes along a fingerboard to aid in teaching an individual how to the play the stringed instrument.

BACKGROUND OF THE INVENTION

One key element in learning how to play an instrument is learning a configuration to generate each respective specific note. Stringed instruments generate different notes by changing the effective vibrational length of the respective string. Each string spans between a location on a bridge, across a nut, and terminates at a respective tuning peg of an engaged tuning machine. The vibrating length of the string is altered by compressing the string against a fingerboard. Some stringed instruments include a series of frets located along the fingerboard in accordance with a scale. The string is compressed against the respective fret to generate the desired note. Other stringed instruments are fretless, where the musician would compress the string against the fingerboard. The location where the string contacts the fingerboard would define the generated note. The music student would need to become familiar with each location where the string would need to be compressed to generate each respective note as part of the learning process.

There are many prior art references to methods to teach instruments and, in particular, teaching devices for teaching an individual how to play string instruments, and more specifically a guitar. A representative example of this in the prior art is Aleksa, D410,671. The Aleksa device is a teaching method specifically for guitar players, wherein the teachings of Aleksa are limited to a design application that fails to include a method.

Another example in the prior art includes Kennedy, U.S. Pat. No. 5,746,605. The Kennedy device is a method to assist in music training in general, including electronic keyboards.

Another reference in the prior art is Ravagni U.S. Pat. No. 5,920,023. This reference is a stringed instrument finger positioning guide and method for teaching students to read music. In this application the fingers of the person playing the instrument are positioned by use of a series of markings both of the front of the neck as well as the side of the neck. Through shear repetition using the method that is taught in this application the beginner player will become more proficient and develop in essence what amounts to muscle memory. This is particularly important because each string has multiple notes depending of the position of the person's fingers on the fret board.

Another reference in the prior art is Sciortino, U.S. Pat. No. 5,373,768. This reference teaches a musical instrument neck illuminator using fiber optics. The current application does not use fiber optics nor is it limited to a neck illuminator. The current application teaches a method by which a person learns to play the guitar through the correct positioning of his or her fingers on the fret board.

Guitars are commonly designed having two primary components: (1) a body and (2) a neck. The neck can be permanently attached to the body or removably attached to the body.

Accordingly, there remains a need in the art for an easily adapting a stringed instrument to aid in training an individual how to play the instrument. The instrument can be any stringed instrument including guitars, bass guitars, violins, cellos, banjos, mandolins, and the like.

SUMMARY OF THE INVENTION

The present invention overcomes the deficiencies of the known art by disclosing a method of fabricated or modifying a fingerboard of a stringed instrument to include notes or note references to aid in teaching a music student how to play the stringed instrument.

In accordance with one embodiment of the present invention, the invention consists of a method of fabricating an educational, teaching for teaching a music student how to play a fretted, stringed instrument, the method comprising steps of:

obtaining a fingerboard for a fretted, stringed instrument;

assembling a series of frets to the fingerboard along a lateral direction across the fingerboard, each fret being located in accordance with a predetermined spacing;

creating a series of note identifiers by cutting a recession into the fingerboard using a laser, each note identifier is created proximate to a string and fret intersection and provided to identify a respective note defined by the adjacent string and fret intersection;

assembling the fingerboard to a neck of the fretted, stringed instrument; and assembling the fretted, stringed instrument neck and fingerboard combination to a fretted, stringed instrument body.

In one aspect, the series of recessions cut into the fingerboard are filled with a forming material, wherein the forming material hardens after being placed within the recess.

In another aspect, the method further comprises a step of applying a coating onto the fingerboard to preserve the integrity of the note identifiers. The coating preferably fills the recessions formed by the laser.

In another aspect, the method further comprises a step of assembling a series of positioning markers onto a playing surface of the fingerboard, wherein the each positioning marker would be located between a pair of adjacent frets.

In another aspect, the method further comprises a step of assembling a series of side positioning markers onto a side surface of the fingerboard, wherein the each side positioning marker would be located between a pair of adjacent frets.

In another aspect, the method further comprises a step of creating a series of nut note identifiers by cutting a recession into the fingerboard using a laser, each nut note identifier is created proximate to a string and nut intersection, wherein each nut note identifier is representative of a respective note defined by the adjacent string and nut intersection.

In another aspect, the note identifiers are generated in a shape representative of a series of whole notes.

In another aspect, the note identifiers are generated in a shape of English alphabetical representations of a series of whole notes.

In another aspect, the note identifiers can be filled with filler of different colors to of different colors to further aid in identifying and distinguishing between different notes. All of the like notes would be filled with like colored filler, wherein each note would be defined by a different color.

In accordance with a second embodiment of the present invention, the invention consists of a method of fabricating an educational, teaching for teaching a music student how to play a stringed instrument, the method comprising steps of:

obtaining a fingerboard for a stringed instrument;

determining a series of locations along each string location along a longitudinal length of the fingerboard where a music student would compress a respective string against the fingerboard to generate specific notes;

creating a series of note identifiers at each determined specific note location along the fingerboard under each string location by cutting a recession into the fingerboard using a laser, each note identifier teaches the music student a location to compress each respective string to generate a specific note;

assembling the fingerboard to a neck of the stringed instrument; and assembling the fretted, stringed instrument neck and fingerboard combination to a stringed instrument body.

In yet another aspect, the laser generation of the series of note references is created upon a fingerboard prior to assembly to a neck of a stringed instrument body.

In yet another aspect, the laser generation of the series of note references is created upon a fingerboard after assembly to a neck of a stringed instrument body.

In yet another aspect, the laser generation of the series of note references is created upon a fingerboard after a neck is assembled to a stringed instrument body.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
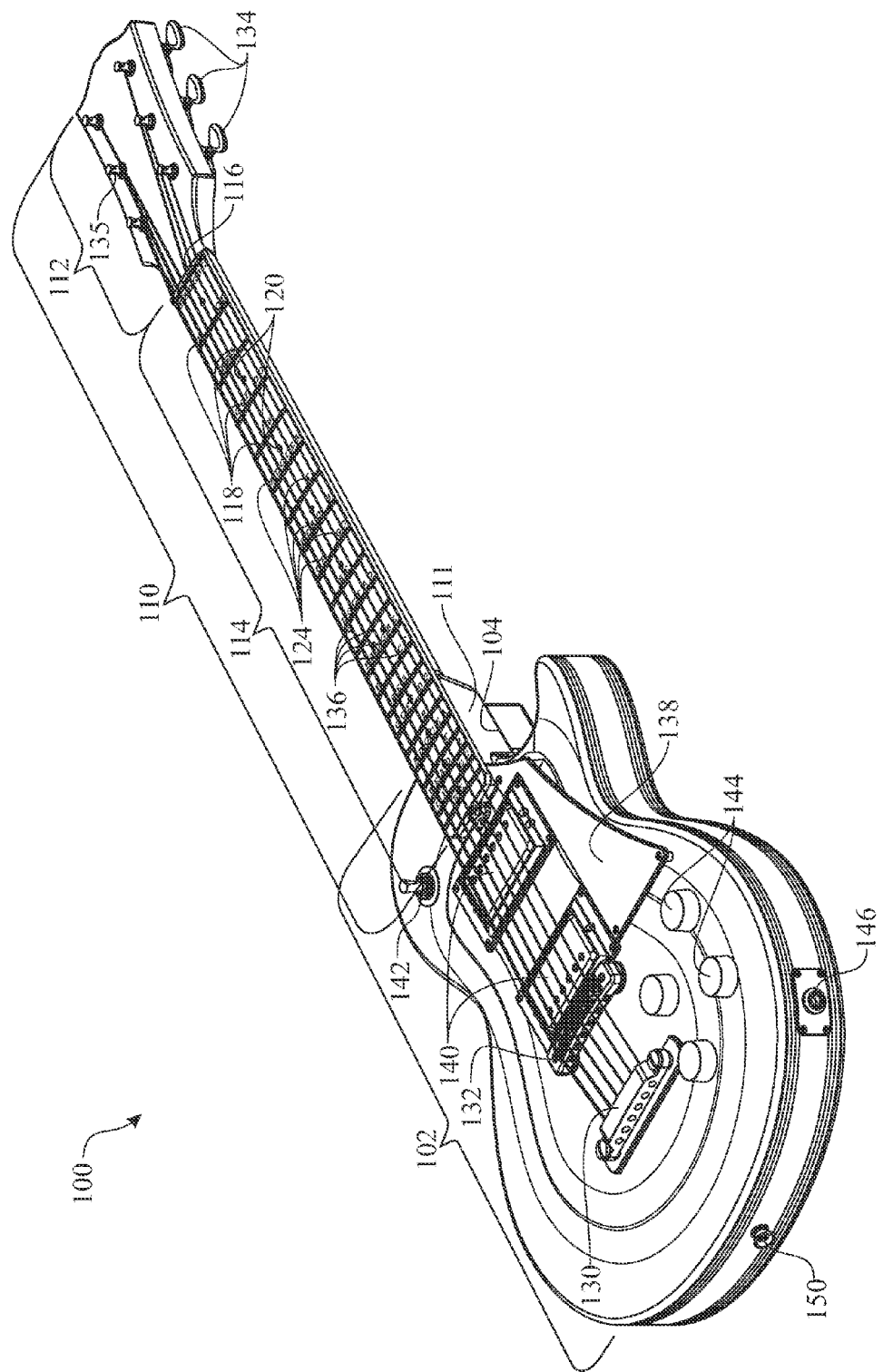
FIG. 1 presents an isometric view of an exemplary training guitar, wherein the illustration introduces the primary components of the training guitar.
Figure 2:
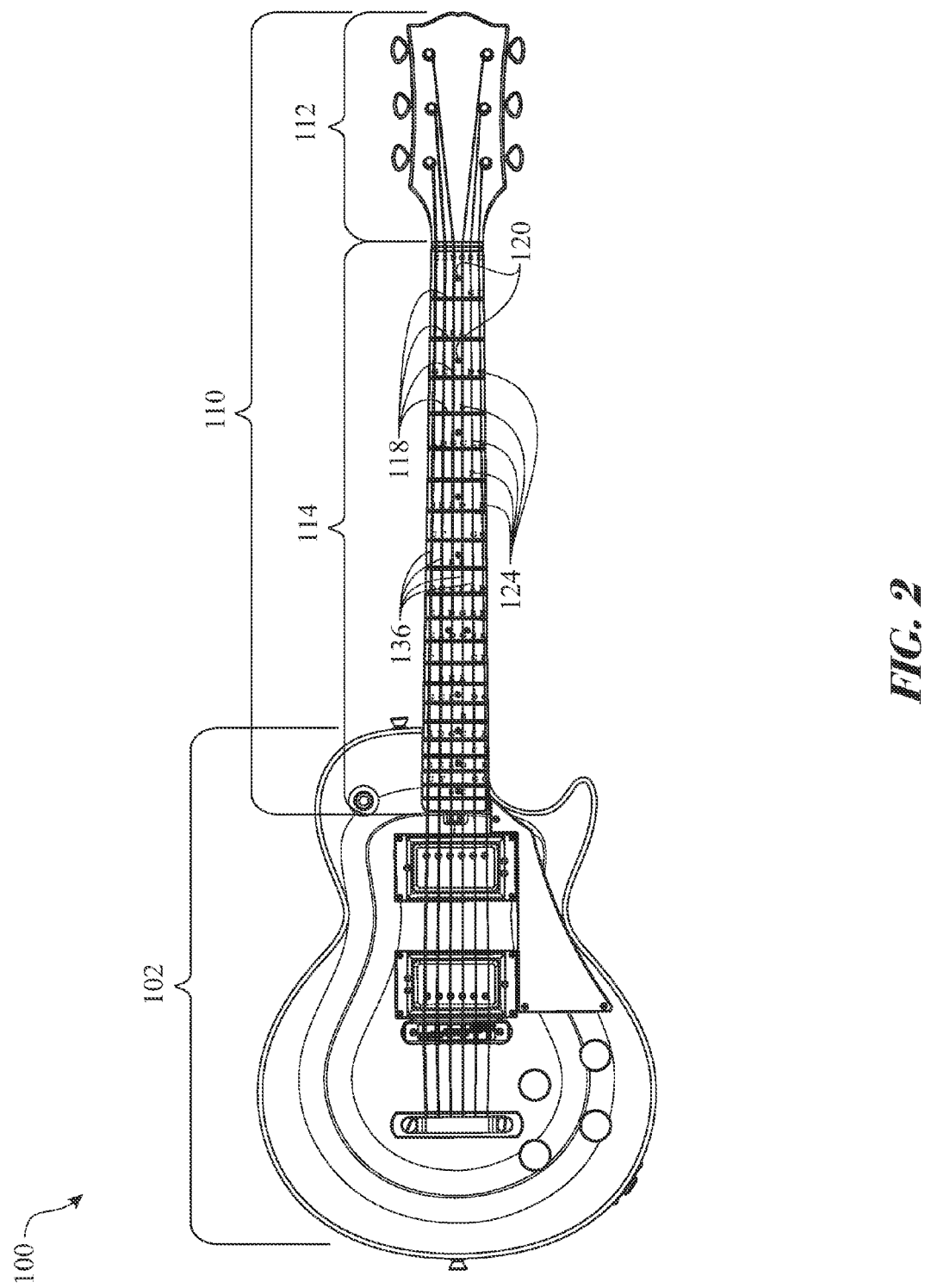
FIG. 2 presents a top view of the exemplary guitar originally introduced in FIG. 1.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Stringed instruments can include guitars, bass guitars, violins, cellos, banjos, mandolins, and the like. Stringed instruments comprise a majority of like elements. A training guitar 100 is presented in FIGS. 1 through 6, wherein the training guitar 100 is representative of any stringed instrument.

Figure 5:
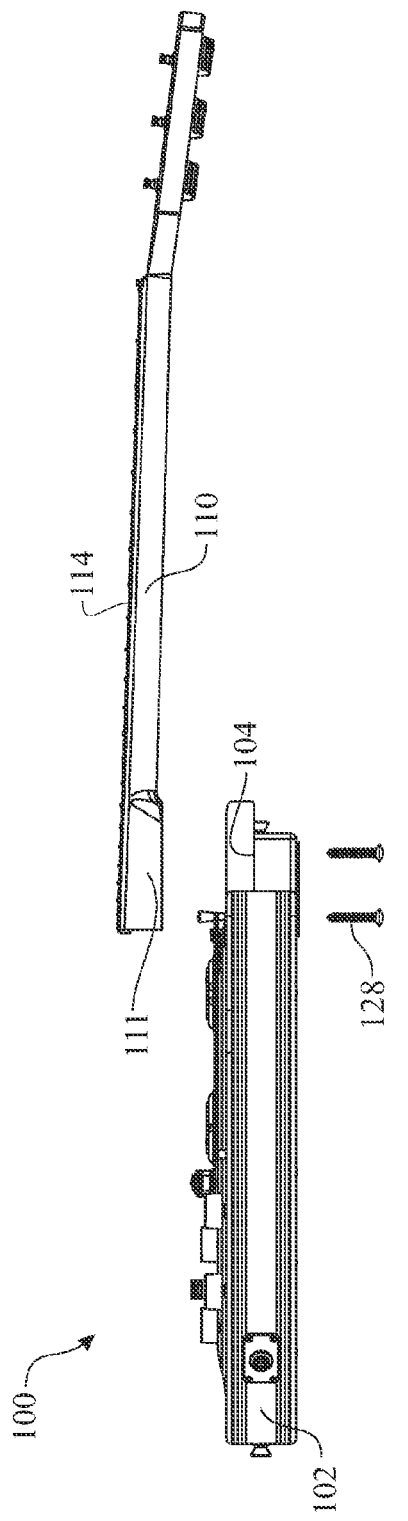
FIG. 5 presents a partially exploded assembly side view of the exemplary guitar originally introduced in FIG. 1.
Figure 6:
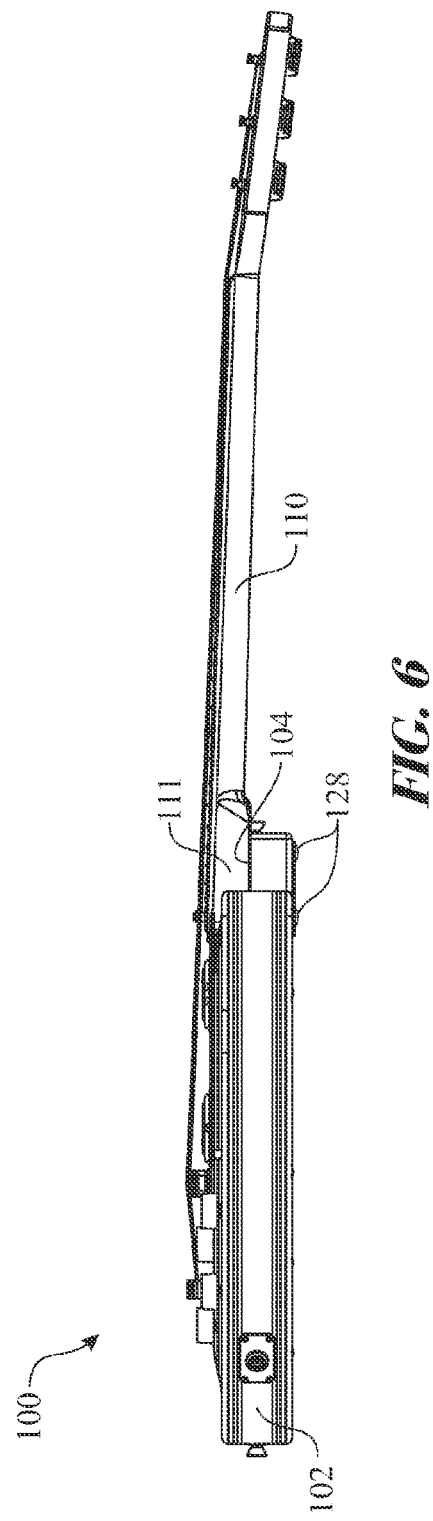
FIG. 6 presents an assembled side view of the exemplary guitar originally introduced in FIG. 1.

Each stringed instrument comprises two primary members: a guitar body 102 and guitar neck 110. Details of the guitar body 102 and guitar neck 110 will be provided below. The guitar neck 110 can be attached to the guitar body 102 using any of a variety of configurations. In one configuration, the guitar neck 110 is integrated into the guitar body 102; commonly referred to as a neck through body configuration. In a second configuration, the guitar neck 110 can be attached to the guitar body 102 using any bonding agent known by those skilled in the art, including a one part epoxy, a two part epoxy, a resin based adhesive, a hide based adhesive, and the like. In a third configuration, the guitar neck 110 can be removably attached to the guitar body 102 by a mechanical fastener. In the exemplary embodiment, the guitar neck 110 is removably attached to the guitar body 102 by a series of neck attachment screws 128 as illustrated in FIGS. 5 and 6. A neck mount section 111 is formed at a base region of the guitar neck 110. A mating neck receptacle 104 is formed within a respective region of the guitar body 102, wherein the neck mount section 111 preferably snugly engages with the neck receptacle 104. Each neck attachment screw 128 is inserted passing through a hole drilled through the guitar body 102 from a rear and threadably engaging with the neck mount section 111. The joint can be reinforced by including a neck support plate (illustrated but not identified) between a head of the neck attachment screws 128 and the back surface of the guitar body 102.

The guitar body 102 can be designed and fabricated in accordance with any of a variety of form factors. The guitar body 102 can be fabricated of a single piece of material, a series of laminated pieces of material, a series of laminated pieces of two or more materials, formed by including one or more bent sheets of material, using one or more carved pieces of material, and the like. The guitar body 102 can be designed to be hollow, semi-hollow, or solid. The shape of the guitar body 102 is determined by the designer. The guitar body 102 is commonly fabricated of a wood. In alternative embodiments, the guitar body 102 can be fabricated of other materials, including a molded plastic, a molded composite, any of a variety of metals, and the like.

The guitar neck 110 is commonly segmented into a headstock 112 and a fingerboard 114. It is noted that the fingerboard 114 can alternatively be referred to as a fretboard 114. The headstock 112 is designed to support a compliment of tuning machines 134. Each tuning machine 134 includes and rotates a tuning peg 135. The shape, size, and angle of the headstock 112 can vary based upon the designer's choice. Each tuning peg 135 is located on the headstock 112 to avoid or at least minimize interference with any of the strings 136. The fingerboard 114 is either shaped upon a playing surface of the guitar neck 110 or fabricated of a separate component and subsequently bonded to an upper surface of the neck 110.

The exemplary embodiment presents a fretted version of the stringed instrument. A fretted instrument refers to an instrument having a series of frets assembled to the fingerboard 114.

Figure 3:
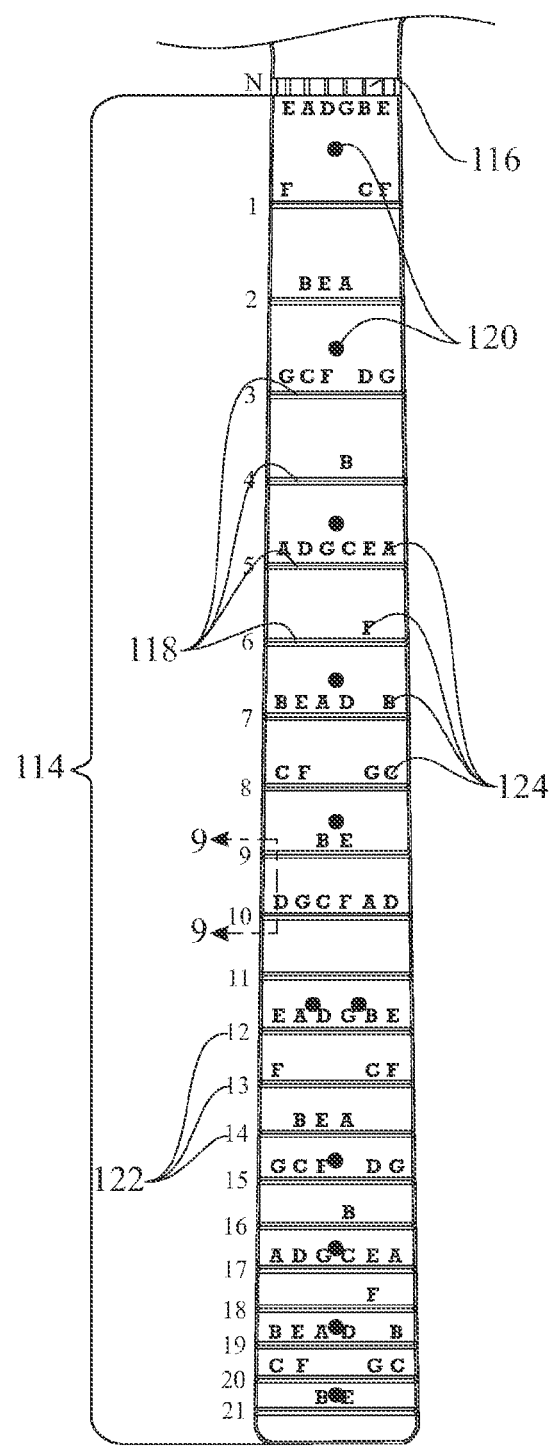
FIG. 3 presents a top view of a fingerboard of the exemplary guitar originally introduced in FIG. 1.
Figure 4:
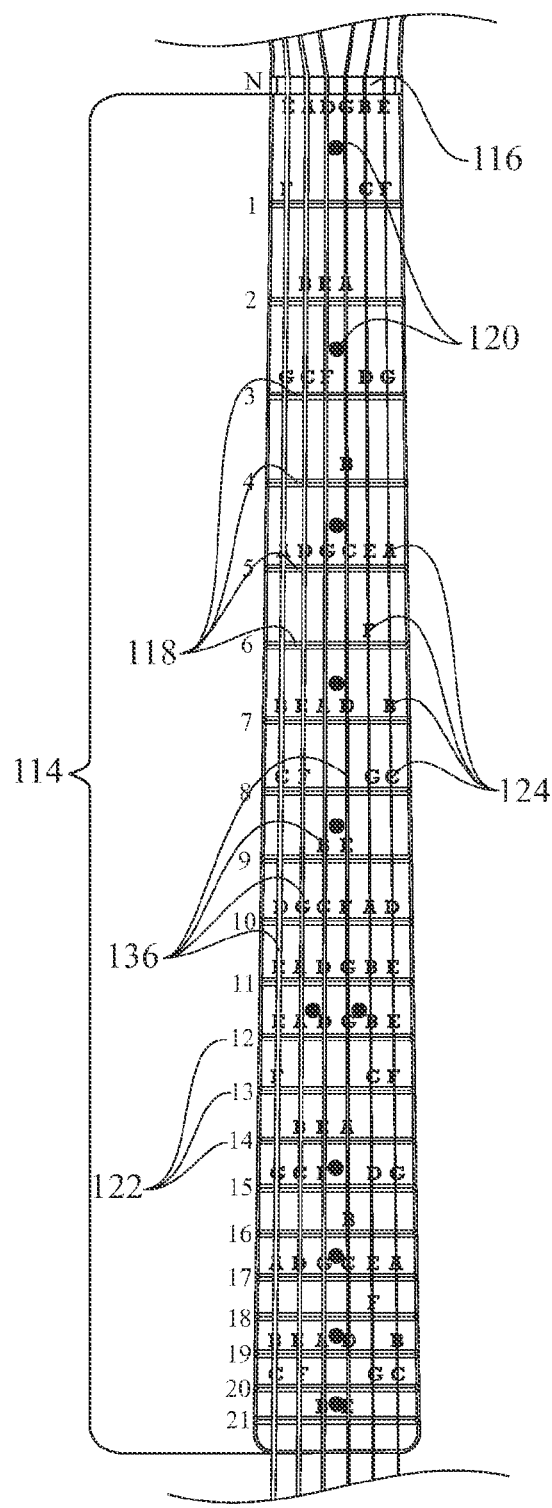
FIG. 4 presents a top view of a fingerboard of the exemplary guitar originally introduced in FIG. 1, the illustration further includes a set of strings to present a locational relationship between the note references, each respective fret, and each respective string.

A fret 118 is a raised element on the neck 110 of the stringed instrument 100. Frets 118 usually extend across the full width of the neck 110. On most modern fretted instruments, frets are metal strips inserted into the fingerboard 114. Frets 118 divide the neck 110 into fixed segments at intervals related to a musical framework. On instruments such as guitars, each fret represents one semitone in the standard western system where one octave is divided into twelve semitones. The frets 118 are referred to by a fret number 122, as illustrated in FIGS. 3 and 4.

The musician applies a compression force to one or more strings 136, pressing the string 136 against a respective fret 118. When the string is vibrated, the string 136 emits a sound at a specific frequency, wherein the specific frequency is referred to as a note. The musician must know which string and which fret combination must be used to generate each specific note.

A fret marker 120 can be included between certain frets 118 to help the musician identify a number of each respective fret 118. It is common to include fret markers 120 to identify the $3^{rd}$, $5^{th}$, $7^{th}$, $9^{th}$, $12^{th}$, $15^{th}$, $17^{th}$, $19^{th}$, $21^{st}$, and $24^{th}$ frets. The exemplary embodiment also includes a fret marker 120 to identify the $1^{st}$ fret 118. The fret markers 120 can be provided in any of a variety of form factors and materials. The industry standard is a circular piece of mother of pearl, referred to as an inlay. The circular inlay is placed into a round hole drilled into the fingerboard 114 using a flat-bottomed drill bit. Although the common material is mother of pearl, it is known by those skilled in the art have been known to use a wide variety of planar sheets of material for the inlay. The inlays can be fabricated of any suitable shape and size, from simple circular designs to elaborate designs spanning the entire fingerboard 114. In additional to a series of fret markers 120, a respective fret side marker 170 (FIG. 9) can be placed on a visible edge of the fingerboard 114.

Figure 9:
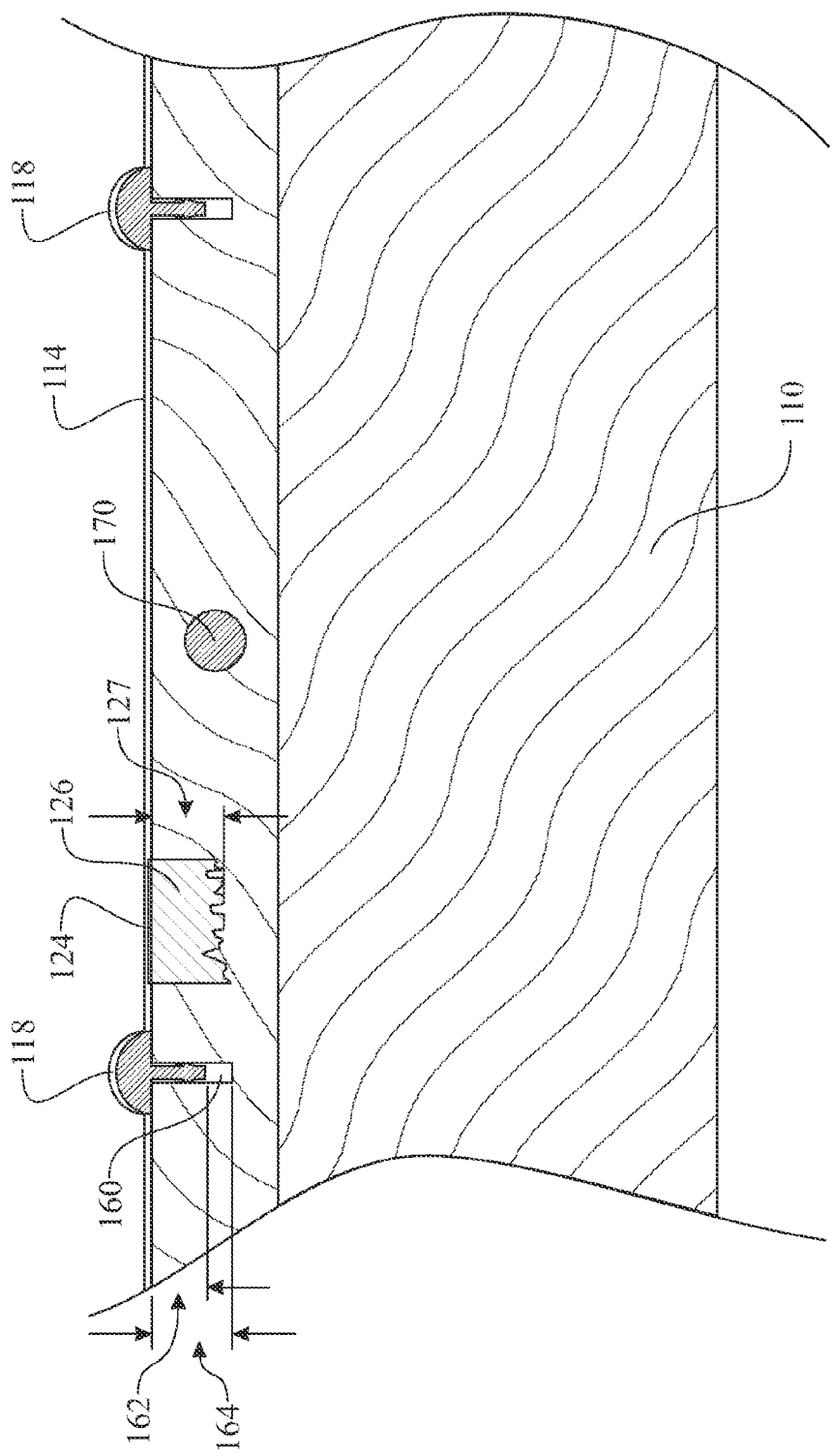
FIG. 9 presents a sectioned side view of the fingerboard illustrating a recess of the laser generated note reference.

In the fretted version of the training guitar 100, a series of fret slots 160 are cut into the fingerboard 114 for receiving a tang of a fret 118 as detailed in a sectioned view presented in FIG. 9. Each fret slot 160 is cut into the fingerboard 114 to a depth described as a fret slot depth 164. The fret slot depth 164 must be greater than a fret depth 162 of each respective fret 118 to ensure a fret 118 properly seats upon the upper surface of the fingerboard 114. Each fret slot 160 is located at a distance from the nut 116 calculated based upon a predetermined scale. Each instrument has one or more standard scales. The scale is used to calculate a span between adjacent apexes of the frets 118 and a bridge 132. Each fret slot 160 is oriented at a right angle (transverse) to a longitudinal length of the fingerboard 114 and cut into the fingerboard 114 to a predetermined minimum fret slot depth 164. The tang of the fret 118 is inserted into the fret slot 160. The fret 118 is retained in position by a series of barbs spatially formed along the tang of the fret 118.

The stringed instrument includes a series of strings 136 spanning along a longitudinal length of the fingerboard 114. Each string 136 is placed under a tension. Each string vibrates at a natural frequency based upon the following equation:

$$f=(\tfrac{1}{2}L)*\sqrt{(T/\mu)}$$

where
  f is the frequency in hertz (Hz) or cycles per second
  T is the string tension in gm-cm/s$^2$
  L is the length of the string in centimeters (cm)
  μ is the linear density or mass per unit length of the string in gm/cm
  $\sqrt{(T/\mu)}$ is the square root of T divided by μ in seconds A bridge end of each string 136 is commonly retained by a tailstock 130. The tailstock 130 can be provided in any of a variety of form factors. The tailstock 130 can be an independent component, integrated into a bridge 132, formed through the guitar body 102, and the like. A nut end of each string 136 is commonly retained by a tuning peg 135 of a respective tuning machine 134. The tuning machine 134 rotates the tuning peg 135 to roll up and collect a portion of the string 136, thus adjusting a tension applied to the string 136. The string is routed from the tailstock 130, eclipsing over a triangular shaped edge formed upon an upper surface of the bridge 132, continuing to a nut 116, and terminating at the tuning peg 135.

The maximum vibrational length of the string 136 is defined by the span between the bridge 132 and the nut 116. The vibrational length can be reduced by applying a pressure to any of the strings 136 to compress the string 136 against a respective fret 118. The fret 118 redefines the vibrational length of the string 136, thus changing the vibrational frequency or note of the string 136.

Each of the strings 136 is fabricated having a different density to change the notes respective to the arrangement of the instrument.

The exemplary training guitar 100 includes electronics to provide an electrical signal output for amplification of the generated music. The vibrations of the strings 136 are converted into an electrical signal by one or more pickups 140. The sound can be manipulated by any of a variety of electrical components or electronic assemblies. A pickup selector switch 142 can be integrated into the circuit to modify a wiring configuration of the one or more pickups 140. The pickup selector switch 142 can be used to split wiring within one pickup 140, modify a wiring configuration between two or more pickups 140, and the like. The training guitar 100 can include one or more pickup selector switches 142, depending on the variety of options desired by the instrument owner. A series of volume and tone controls 144 can be integrated into the circuit, enabling adjustments to the output volume and/or tone of the electrically generated sound. The electrically generated sound signal is transferred from the training guitar 100 to another electrically operated device by an output jack connector 146. The electrically operated device can amplify the signal and transfer the signal to a speaker; manipulate the electrically generated sound signal to modify the signal (commonly accomplished by an effects device), changing the resulting sound; recording the output sound, and the like.

The training guitar 100 can include additional accessories, including a pickguard 138 for protecting the finish of the guitar body 102 from scratches during use and a strap fastener 150 for attachment of a shoulder strap. The size, shape, and location of the pickguard 138 and strap fastener 150 can vary.

The training guitar 100 can be manufactured or modified to include a series of note references 124. Each note reference 124 is created by laser engraving the fingerboard 114. Exemplary processes for creating the series of note references 124 are presented in FIGS. 7 through 9. The series of note references 124 is formed by using a laser wood removal system 200 to remove material from the fingerboard 114.

The exemplary embodiment presents a training guitar 100 having a typical whole tone scale. A beginner guitar player will typically learn on the whole tone scale. This scale is comprised of a given set of notes corresponding to a set of strings, which are tuned or tightened to produce the following sounds from top string to bottom string: E, A, D, G, B and E. For purposes of this application the whole tone scale will be used. In stringing most guitars, the top string 136 is the thickest or heaviest string 136 and the bottom string 136 is the thinnest or lightest string 136.

On the whole note scale the strings 136 from top to bottom play the following notes When played "open" i.e. without depressing the string: F, A, D, G, B, E. For purposes of this illustration it is assumed that the strings have been properly tightened or tuned to produce the specific note sound or quality. For instance, if the person produced the top string 136 without depressing the string 136 against any of the frets 118, the sound produced would be an "E" and if the second string 136 was plucked the sound produced would be an "A" and so on.

The musician would depress a respective string 136 against a desired fret 118 to change the output note of the respective string 136. If the person wanted to produce an "E" note while pressing on the fret length the person could press the third string above the second fret. Likewise if a person wanted to produce an "F" the person could press the top or the bottom string above the first fret. This device trains the individual where to position his or her fingers in order to produce the desired tonic sound.

A laser wood removal system 200 is used to modify the fingerboard 114 as desired. The laser wood removal system 200 includes a laser programming station 210, which programs a laser controller 220, wherein the laser controller 220 operates a laser 230 to remove the desired material from the fingerboard 114 forming each of the note references 124 of the series of note references 124. Each note reference 124 is formed by laser engraving a recession within the fingerboard 114 to a note reference depth 127. The laser programming station 210 can be any computing device, preferably including a computer 212, a monitor 214 and a user computer input appliance 216. The user would generate a series of instructions that are passed to the laser controller 220 for directing the operation of the laser 230. The object is placed upon a table. The laser 230 is moved in accordance with a coordinate system to change the longitudinal 224 and lateral 222 positions thereof. Although the exemplary embodiment moves the laser 230, it is understood that the supporting platform (not shown) can move the object, where the laser 230 would remain stationary. The exemplary coordinate system can additionally include a vertical component to adjust the focal point of the laser beam 232. Alternatively, the laser 230 can include a focal adjustment to change the focal length of the beam. The laser 230 emits a laser beam 232, directing a focal point onto a surface of the fingerboard 114. The laser beam 232 removes material from the fingerboard 114 forming the images of the note references 124. The distance of travel of the coordinate system is preferably sufficient to span an entire width and length of the fingerboard 114. Should the distance of travel of the laser control system be smaller that the entire width and length of the fingerboard 114, the user would reposition the object to accommodate the travel limitations of the system.

The operator would create a program to generate the series of note references 124. The program would utilize exemplary entry data 219, including dimensional information of the neck 110, including a length of the fingerboard 114, a width of the fingerboard 114 at the bridge end, a width of the fingerboard 114 at the nut end, a distance between strings 136, a number of installed frets 118, a scale or spacing between frets 118, the material of the fingerboard 114, the desired style of marking for the note references 124, a desired depth of each note reference 124, and the like. The desired depth of each note reference 124 can be between just a fraction of a millimeter or up to 6.5 millimeters (¼ of an inch). The note references 124 can be designed in any image, wherein a preferable image is an alphabetical representation of each whole note as best illustrated in FIG. 3. The designer can select a font from any available font. Each note reference 124 would be located proximate an intersection between a respective note defining point and the respective string 136, as best illustrated in FIG. 4. The first series of note references 124 would be placed proximate the nut 116. The remaining note references 124 would be located proximate the respective fret 118.

The laser engraving process is affected by the density of the material of the fingerboard 114. Fingerboards 114 are commonly fabricated of a wood, such as rosewood, ebony, maple, and the like. The grain of the woods causes differences in the depth of the cut generated by the laser as illustrated in FIG. 9. The note references 124 can be finished in a several ways as a result of the variations in the cut depth and the narrow lines required to form the note references 124. The recessions can be left as formed to present a less noticeable appearance. The recessions can be filled with a formable note reference filler 126 and subsequently cured, wherein the note reference filler 126 is colored to contrast the fingerboard 114, thus presenting a more distinguished and noticeable appearance. The note reference filler 126 can be an epoxy, paint, a resin, a heated metal, and the like. Once cured, the upper surface can be leveled with the upper surface of the fingerboard 114. The note reference filler 126 can be of different colors to further aid in identifying and distinguishing between different notes.

Figure 7:
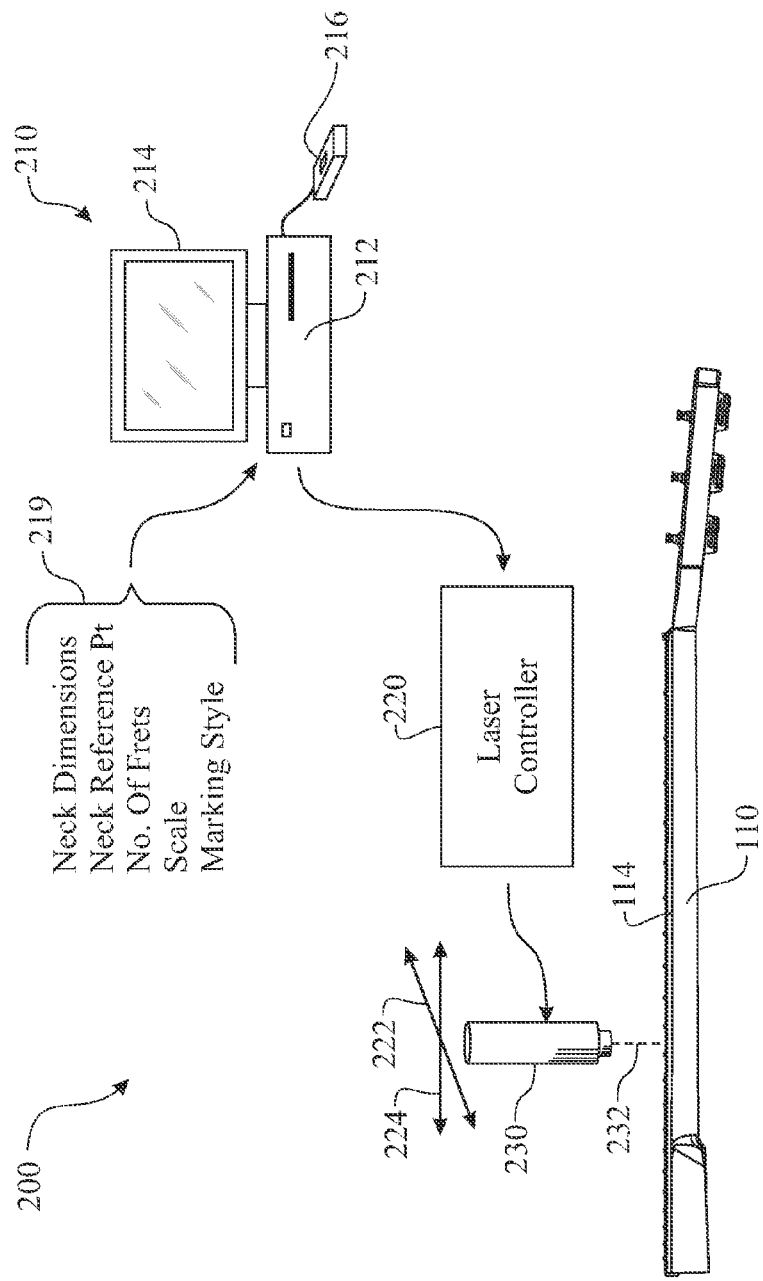
FIG. 7 presents a first exemplary block diagram representative of a laser note reference forming process, wherein the process is accomplished when the neck is separated from the stringed instrument body.
Figure 8:
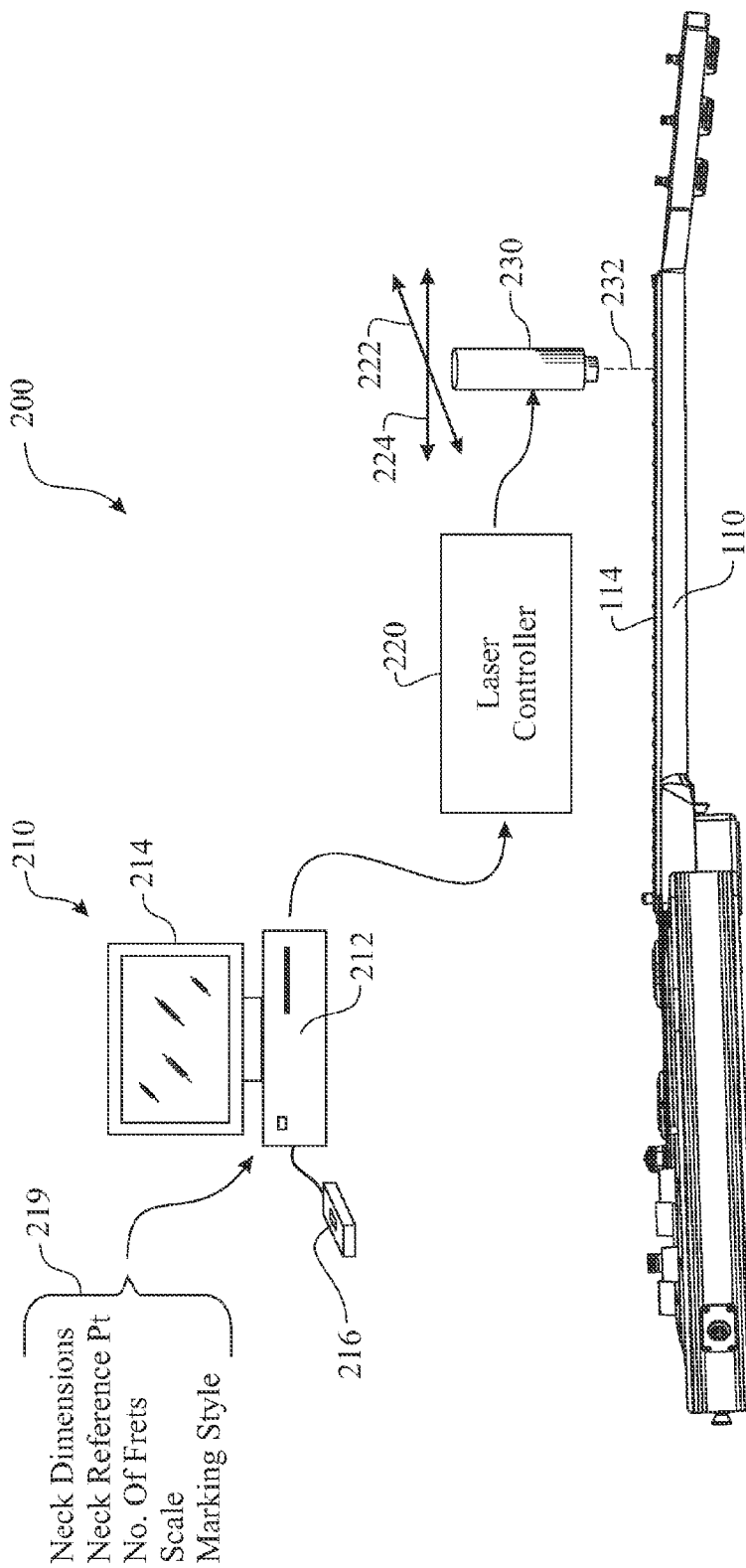
FIG. 8 presents a second exemplary block diagram representative of a laser note reference forming process, wherein the process is accomplished upon a finished stringed instrument.

In use, the process can be adapted to either neck assembly configuration of the training guitar 100. In a configuration where the guitar neck 110 is removably attached to the guitar body 102, the guitar neck 110 is removed and placed upon a support of the laser wood removal system 200 as illustrated in FIG. 7. After processing, the guitar neck 110, is reattached to the guitar body 102. In a configuration where the guitar neck 110 is permanently attached to the guitar body 102, the training guitar 100 is placed upon a support of the laser wood removal system 200 as illustrated in FIG. 7.

The training guitar 100 is intended to quickly train the beginner musician to position his or her fingers on the appropriate fret 118 by imprinting the notes 124 into the fingerboard 114 of the guitar neck 110. Because the notes change along the neck and because different notes can be played depending on the positioning of the fingers along the neck 110 of the guitar 100, all the notes for a particular scale are imprinted along the neck 110 of the guitar 100 and the neck 110 can be easily removed, if needed. In this manner if the person wanted to learn a particular scale, the person would secure the appropriate neck with the proper indicators and practice using that neck. Through repetition the person would develop muscle memory and in this manner would quickly learn the scale by visual reference to the markers 170 of the side of the neck 110 of the guitar 100.

The method to imprint the notes should not alter the sound of the note or the quality of the sound. The electronic system can enhance the education process, wherein the signal output can be connected to a computing device to provide feedback to the student. The computing device can include software to record the music generated by the training guitar 100, analyze the generated music against a reference to determine if the musician is playing the song correctly, and the like. The system can also be used to aid in training the student how to play scales, cords, and the like.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

Element Description References

| Ref.No. | Description |
| --- | --- |
| 100 | training guitar |
| 102 | guitar body |
| 104 | neck receptacle |
| 110 | guitar neck |
| 111 | neck mount section |
| 112 | headstock |
| 114 | fingerboard |
| 116 | nut |
| 118 | fret |
| 120 | fret marker |
| 122 | fret number |
| 124 | note reference |
| 126 | note reference filler |
| 127 | note reference depth |
| 128 | neck attachment screw |
| 130 | tailstock |
| 132 | bridge |
| 134 | tuning machine |
| 135 | tuning peg |
| 136 | string |
| 138 | pickguard |
| 140 | pickup |
| 142 | pickup selector switch |
| 144 | volume and tone controls |
| 146 | output jack connector |
| 150 | strap fastener |
| 160 | fret slot |
| 162 | fret depth |

-continued

Element Description References

| Ref.No. | Description |
| --- | --- |
| 164 | fret slot depth |
| 170 | fret side marker |
| 200 | laser wood removal system |
| 210 | laser programming station |
| 212 | computer |
| 214 | monitor |
| 216 | user computer input appliance |
| 219 | exemplary entry data |
| 220 | laser controller |
| 222 | laser lateral movement |
| 224 | laser longitudinal movement |
| 230 | laser |
| 232 | laser beam |

What is claimed is:

1. A method of creating an instrument for teaching a music student how to play a fretted, stringed instrument, the method comprising steps of:

obtaining a fingerboard for a fretted, stringed instrument;

assembling a series of frets to said fingerboard along a lateral direction across said fingerboard, each fret being located in accordance with a predetermined spacing;

creating a series of note identifiers by cutting a recession into said fingerboard using a laser, each note identifier is created proximate to a string and fret intersection and provided to identify a respective note defined by the adjacent string and fret intersection;

assembling said fingerboard to a neck of said fretted, stringed instrument; and assembling said fretted, stringed instrument neck and fingerboard combination to a fretted, stringed instrument body.

2. A method of creating an instrument for teaching a music student how to play a fretted, stringed instrument as recited in claim 1, the method further comprises the step of:

applying a coating onto the fingerboard to preserve the integrity of the note identifiers.

3. A method of creating an instrument for teaching a music student how to play a fretted, stringed instrument as recited in claim 1, the method further comprises the step of:

assembling a series of positioning markers onto a playing surface of said fingerboard, wherein the each positioning marker would be located between a pair of adjacent frets.

4. A method of creating an instrument for teaching a music student how to play a fretted, stringed instrument as recited in claim 3, the method further comprises the step of:

applying a coating onto the fingerboard to preserve the integrity of the note identifiers.

5. A method of creating an instrument for teaching a music student how to play a fretted, stringed instrument as recited in claim 1, the method further comprises the step of:

assembling a series of side positioning markers onto a side surface of said fingerboard, wherein the each side positioning marker would be located between a pair of adjacent frets.

6. A method of creating an instrument for teaching a music student how to play a fretted, stringed instrument as recited in claim 1, the method further comprises the step of:

creating a series of nut note identifiers by cutting a recession into said fingerboard using a laser, each nut note identifier is created proximate to a string and nut intersection, wherein each nut note identifier is representative of a respective note defined by the adjacent string and nut intersection.

7. A method of creating an instrument for teaching a music student how to play a fretted, stringed instrument as recited in claim 1, wherein the step of creating a series of note identifiers identifies whole notes.

8. A method of creating an instrument for teaching a music student how to play a fretted, stringed instrument as recited in claim 7, wherein the step of creating a series of note identifiers is limited to identifying whole notes.

9. A method of creating an instrument for teaching a music student how to play a fretted, stringed instrument, the method comprising steps of:
    obtaining a neck for a fretted, stringed instrument, said neck comprising a fingerboard assembled thereon, said fingerboard comprising a series of frets assembled thereto along a lateral direction across said fingerboard, each fret being located in accordance with a predetermined spacing;
    creating a series of note identifiers by cutting a recession into said fingerboard using a laser, each note identifier is created proximate to a string and fret intersection and provided to identify a respective note defined by the adjacent string and fret intersection;
    assembling said fingerboard to a neck of a fretted, stringed instrument; and
    assembling said fretted, stringed instrument neck and fingerboard combination to a fretted, stringed instrument body.

10. A method of creating an instrument for teaching a music student how to play a fretted, stringed instrument as recited in claim 9, the method further comprises the step of:
    applying a coating onto the fingerboard to preserve the integrity of the note identifiers.

11. A method of creating an instrument for teaching a music student how to play a fretted, stringed instrument as recited in claim 9, the method further comprises the step of:
    assembling a series of positioning markers onto a playing surface of said fingerboard, wherein the each positioning marker would be located between a pair of adjacent frets.

12. A method of creating an instrument for teaching a music student how to play a fretted, stringed instrument as recited in claim 11, the method further comprises the step of:
    applying a coating onto the fingerboard to preserve the integrity of the note identifiers.

13. A method of creating an instrument for teaching a music student how to play a fretted, stringed instrument as recited in claim 9, the method further comprises the step of:
    assembling a series of side positioning markers onto a side surface of said fingerboard, wherein the each side positioning marker would be located between a pair of adjacent frets.

14. A method of creating an instrument for teaching a music student how to play a fretted, stringed instrument as recited in claim 9, the method further comprises the step of:
    creating a series of nut note identifiers by cutting a recession into said fingerboard using a laser, each nut note identifier is created proximate to a string and nut intersection, wherein each nut note identifier is representative of a respective note defined by the adjacent string and nut intersection.

15. A method of creating an instrument for teaching a music student how to play a fretted, stringed instrument as recited in claim 9, wherein the step of creating a series of note identifiers identifies whole notes.

16. A method of creating an instrument for teaching a music student how to play a fretted, stringed instrument as recited in claim 15, wherein the step of creating a series of note identifiers is limited to identifying whole notes.

17. A method of creating an instrument for teaching a music student how to play a fretted, stringed instrument, the method comprising steps of:
    obtaining a neck for a fretted, stringed instrument, said neck comprising a fingerboard assembled thereon, said fingerboard comprising a series of frets assembled thereto along a lateral direction across said fingerboard, each fret being located in accordance with a predetermined spacing;
    creating a series of notes by cutting a recession into said fingerboard using a laser, each note is created proximate to a string and fret intersection, wherein each note is created as a human legible letter respective to a respective note defined by the adjacent string and fret intersection; and
    assembling said fretted, stringed instrument neck and fingerboard combination to a fretted, stringed instrument body.

18. A method of creating an instrument for teaching a music student how to play a fretted, stringed instrument as recited in claim 17, the method further comprises the step of:
    applying a coating onto the fingerboard to preserve the integrity of the note identifiers.

19. A method of creating an instrument for teaching a music student how to play a fretted, stringed instrument as recited in claim 17, the method further comprises the step of:
    creating nut notes by cutting a recession into said fingerboard using a laser, each nut note is created proximate to a string and nut intersection, wherein each nut note is created as a human legible letter respective to a respective note defined by the adjacent string and nut intersection.

20. A method of creating an instrument for teaching a music student how to play a fretted, stringed instrument as recited in claim 17, the method further comprises the step of:
    applying a coating onto the fingerboard to preserve the integrity of the note identifiers.

* * * * *